United States Patent Office 3,543,037
Patented Nov. 24, 1970

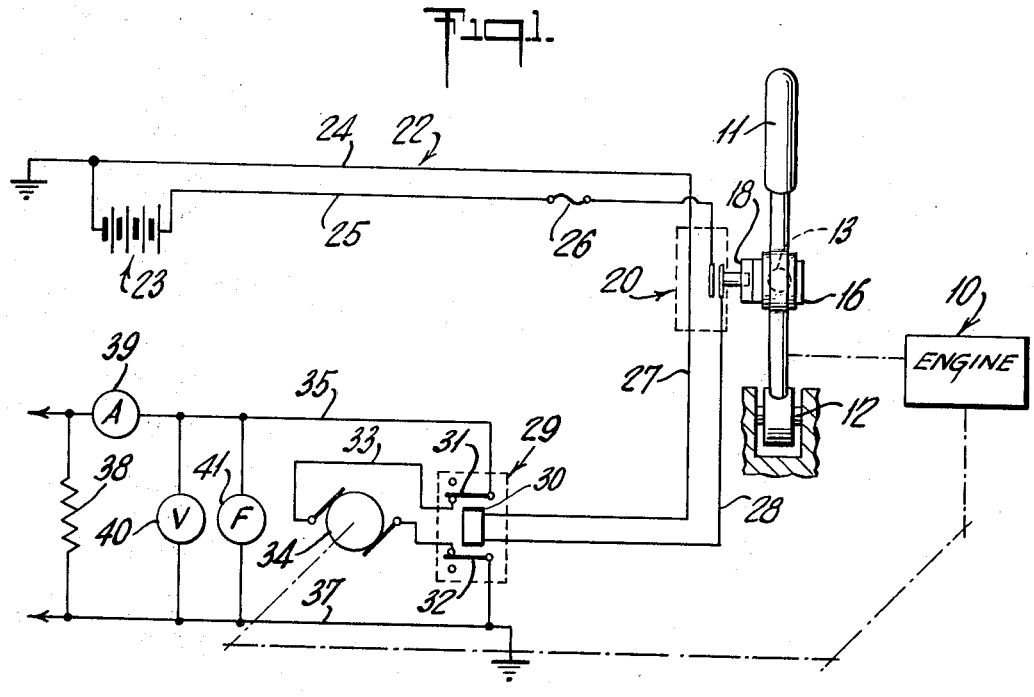
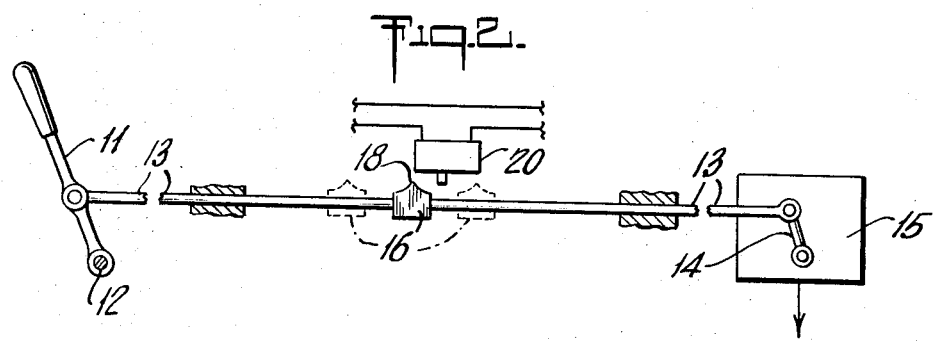
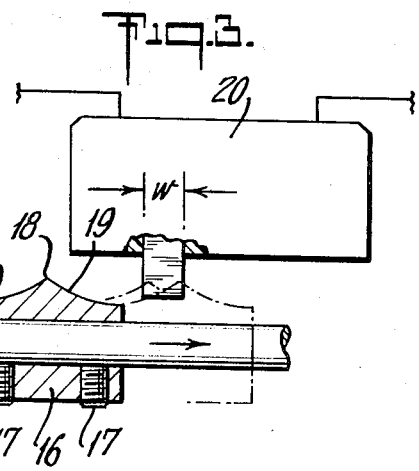

3,543,037
LOAD DISCONNECTING DEVICE FOR AN ALTERNATOR ADAPTED FOR ROTATION AT VARYING SPEED
Norman F. Baldwin, 900 Harbor Drive,
Key Biscayne, Fla. 33149
Filed Mar. 12, 1969, Ser. No. 806,539
Int. Cl. H02p 9/00
U.S. Cl. 290—7
5 Claims

ABSTRACT OF THE DISCLOSURE

An auxiliary alternator driven at varying speeds by a prime mover, the speed of said prime mover being governed by a speed selector, the alternator being connected to a load only when the speed selector is in a position corresponding to a speed which has been preselected as producing a desired alternating current frequency.

BACKGROUND OF THE INVENTION

Many pleasure boats are equipped with a diesel engine, the speed of which is controlled by a governor. The operator need only position a speed control handle or selector in a position corresponding to a desired engine speed and the governor of the engine will regulate the fuel flow to maintain the selected engine speed. It is common for the operators of such boats to maintain the engine at a customary fixed cruising speed for a large part of the time the craft is under way. The engine reduction gearing and the propeller shape is chosen in relation to the desired engine cruising speed. On occasion, however, a boat engine may be operated for relatively long periods at a speed considerably faster or slower than its cruising speed.

Many pleasure boats are berthed at docks where 60 cycle, 110 volt alternating current is available from the shore. It is convenient to equip such craft with electric refrigerators, electric stoves, electric heaters, and other electrically operated devices adapted to operate on 110 volt, 60 cycle alternating current. The boat's internal electrical distribution system serving these devices can then be energized from the shore when the craft is in its berth. In most instances, small craft are equipped with a self-sufficient electrical system in which a battery supplies direct current at 12 or 24 volts. The battery is usually kept charged by a direct current generator driven by the main engine. If appliances such as a 110-volt, 60 cycle refrigerator are to operate when the craft is disconnected from the shore electrical system a 110-volt, 60 cycle alternator is required in addition to the usual direct current generator. Such alternators are available and, as currently used, are operated by their own auxiliary engines. Such auxiliary engines run at all times when the shipboard generation of alternating current is desired. Such constant running may be undesirable due to the wear imposed on the auxiliary engine and its usual low efficiency in the use of fuel. The auxiliary motor also, of course, adds to the weight, crowding, complexity, and expense of the boat in which it is installed.

SUMMARY

The invention seeks either to eliminate the auxiliary motor now used to drive an alternator or if such a motor is retained, to make its operation unnecessary while the main motor is running at cruising speed. In order to achieve this objective, an alternator is mechanically driven by the main engine by means, for example, of a drive belt. The speed of this alternator varies with the speed of the main motor. The drive belt pulley diameters are so chosen that when the main motor is running at its customary cruising speed the alternator will rotate at a speed adapted to produce alternating current of the desired frequency.

In order to avoid the adverse effects of variations in the speed of the alternator (and hence of frequency changes in the output), a switch system is provided which disconnects the alternator from the electrical circuit it is feeding when the speed of the main motor deviates beyond a certain amount from its cruising speed. This switch system may be very simple in a boat in which the speed of the main engine is controlled by a governor, since the position of the engine speed control handle is directly related to the engine speed, and can be used to actuate the switch system.

With the invention described, some craft may be able to dispense with an alternator driven by an auxiliary engine. For example, it is not necessary to supply current constantly to most electric refrigerators in order for them to remain satisfactorily cold. As long as the boat's main engine runs at its cruising speed at reasonably frequent intervals the lack of alternating current when the motor operates at reduced speed is of little consequence. Even if an auxiliary engine is provided to operate an alternator, with the invention to be described below such auxiliary motor need not run when the main engine is at cruising speed. In addition, the invention can serve as an emergency generator in the event that the auxiliary motor fails. For example, even with the boat at anchor the main engine can be run in neutral at its cruising speed in order to supply alternating current to keep the refrigerator cold or to allow use of an electric stove.

BRIEF DESCRIPTION OF THE DRAWINGS

FIG. 1 is a circuit diagram illustrating the circuits which control the operation of the alternator.

FIG. 2 is a view of a speed control mechanism for a main engine; and

FIG. 3 is an enlarged view of a portion of the speed control mechanism of FIG. 2.

DESCRIPTION OF THE PREFERRED EMBODIMENT

FIG. 1 shows a diesel engine 10 (indicated schematically) which is suitably linked to a control mechanism comprised of control handle 11 arranged to rotate about pivot 12. Movement of the control handle is transmitted by push-rod 13 to a rotatable control lever 14 on a speed control governor 15. The structure of such governors is well known and is not shown in detail. For each position of the control lever 14 there is a given engine speed which the governor establishes and keeps substantially constant. An alternator 34 is connected in driven relationship to engine 10 by any convenient means (not shown). The connection may be by gearing or by the common expedient of a drive belt which passes over a pulley on the engine output shaft and a pulley on the alternator shaft. The speeds of the engine and alternator will be inversely proportioned to the diameters of the engine pulley and the alternator pulley in such a construction.

As seen in FIGS. 2 and 3, a cam block 16 is clamped to the push-rod by a pair of set screws 17, 17. The upper surface of the cam block is shaped to provide a cusp 18 defined by cam surfaces 19, 19 which slope inward and upward to the cusp.

A microswitch 20 is mounted adjacent the path of movement of the cam block. A cam follower 21 projects into the path of the cam block, and when the control handle 11 is positioned to cause the engine to run at its cruising speed the cusp 18 raises the cam follower, closing the microswitch.

As may be seen in FIG. 1, when microswitch 20 is closed a relay circuit 22 is completed. This circuit is comprised of the ship's battery 23 which is connected to the microswitch by wires 24 and 25, the latter wire being interrupted by a fuse 26. If desired, a circuit breaker may be substituted for this fuse. Wires 27 and 28 carry the current to relay box 29, where it passes through relay 30, closing switches 31 and 32. The closing of these switches connects wire 33 from alternator 34 with distribution wire 35, and connects wire 36 from the alternator with distribution wire 37. An appliance, indicated by resistance 38, may be fed by these distribution wires. Opening of microswitch 20 breaks the current to relay 30, allowing switches 31 and 32 to open under spring pressure.

As shown in FIG. 1 an ammeter 39, a voltmeter 40, and a frequency meter 41 may be inserted in the distribution circuit to measure the performance of the alternator.

For practical purposes it is not necessary to control the frequency of the alternator with great precision. The system will function satisfactorily in spite of some variations in alternator speed, i.e., in the neighborhood of plus or minus 3 to 5% of the theoretical design speed. In one test installation aboard ship the standard governor on a small diesel main engine maintained sufficient speed control to enable the system to work properly, in spite of speed variations resulting from propeller load variations as a result of heavy seas.

The tolerance of the system for frequency variations makes possible the use of a control circuit which will connect the alternator to a load as long as the speed control handle 11 is within a certain range of positions. The width of the cam follower 21 (indicated as $w$ in FIG. 3) establishes this range.

It will be obvious that numerous means may be found for connecting the alternator to the distribution system when the main engine speed control selector is in a certain range of positions, and disconnecting the generator when the selector leaves said range of positions. It will also be obvious that the alternator may be prevented from feeding the distribution system by a relay which opens an internal circuit in the alternator, such as that carrying the field current, rather than the relay illustrated which interrupts the alternator output circuit.

Where desired the connection between the engine and the alternator may be a variable speed drive. For example, it may comprise a belt connection employing a plurality of sets of matched pulleys such as has been used in lathe drives, or it may be a gearbox similar to an automobile transmission. With such an arrangement the main engine may run at a variety of speeds each of which may be made to drive the alternator at its preselected desired speed. By suitably readjusting the position of the cam block relative to the push rod the alternator may be rendered operative at the new engine speed. For example, if a boat engine is to be driven for a period of time at three quarters of its normal cruising speed, the ratio between the speed of the engine and that of the alternator may be varied by means of the variable speed drive so that the alternator will continue to be driven at its usual design speed. If the position of the cam block or the push rod is suitably readjusted, when the engine is operated at the new slower speed the microswitch will connect the alternator to the load.

While the invention has been described above in connection with a boat engine, it may be used with any governor-controlled engine. For example, it may be desirable to equip emergency vehicles having such engines with the invention for use as mobile generating stations in time of disaster.

I claim:

1. An alternating current generating system for use in combination with a governor-controlled engine, said governor having a speed selection control movable among a plurality of positions each corresponding to a desired engine speed, said system comprising:
    (a) an alternator having a design speed at which said alternator is designed to operate and produce an alternating current of a desired frequency;
    (b) means connecting the alternator to the engine in driven relation thereto, said means maintaining a fixed ratio of alternator speed to engine speed;
    (c) distribution means for distributing current from the alternator to a load;
    (d) deactivation means for preventing the generation of an electric current in the distribution means by the alternator when the governor speed selection control is positioned away from a desired position, said desired position corresponding to that engine speed which in turn corresponds to the design speed of the alternator.

2. The alternating current generating system of claim 1 wherein the deactivation means comprises a switch which disconnects an output lead of the alternator from the distribution means.

3. The alternating current generating system of claim 1 wherein the deactivation means comprises:
    (a) an output lead from the alternator;
    (b) a relay circuit in series between the output lead and the distribution means, said relay circuit having a closed position in which the output lead is electrically connected to the distribution means and an open position in which the output lead is electrically disconnected from the distribution means;
    (c) control means for placing the relay circuit in the open position when the governor speed selection control is positioned away from the desired position and for placing the relay circuit in the closed position when the governor speed selection control is in the desired position.

4. The alternating current generating system of claim 3, wherein the control means comprises:
    (a) a magnetic relay which, when an electric current is flowing in the winding thereof, moves the relay circuit into the closed position;
    (b) a source of electric control current suitable for the operation of the magnetic relay; and
    (c) a switch associated with the speed selection control movable from an open to a closed position when the speed selection control is moved into the desired position, said switch when in the closed position connecting the winding of the magnetic relay to the source of electric current.

5. An alternating current generating system for use in combination with a governor-controlled engine, said governor having a speed selection control movable among a plurality of positions, each corresponding to a desired engine speed, said system comprising:
    (a) an alternator having a design speed at which said alternator is designed to operate and produce an alternating current of a desired frequency;
    (b) output leads from the alternator;
    (c) distribution wires adapted to carry current to a load;
    (d) a switch operated by a magnetic relay, the relay when energized by a direct-current closing the switch and when not so energized opening said switch, said switch when in the closed position connecting the output leads from the alternator to the distribution system;
    (e) a source of direct current;
    (f) an electric circuit containing a relay-control switch, said circuit connecting the source of direct current to the magnetic relay when the relay control switch is in a closed position;

(g) a cam connected to and movable with a portion of the speed selection control;
(h) a cam follower connected to the relay control switch, said cam follower being movable between a first position in which the relay control switch is in an open position and a second position in which the relay control switch is in its closed position;
(i) surfaces on the cam contacting the cam follower and holding said cam follower in the second position when the speed selection control is moved to a position corresponding to an engine speed which in turn corresponds to the design speed of the alternator.

References Cited

UNITED STATES PATENTS

| | | | |
|---|---|---|---|
| 2,373,334 | 4/1945 | Palmer | 290—40 |
| 2,612,249 | 9/1952 | Horn | 290—1 X |

BENJAMIN DOBECK, Primary Examiner

W. E. DUNCANSON, Jr., Assistant Examiner

U.S. Cl. X.R.

290—40; 322—15